United States Patent
Ostrovsky et al.

(10) Patent No.: US 7,058,743 B2
(45) Date of Patent: Jun. 6, 2006

(54) METHOD AND DEVICE FOR DYNAMIC INTERRUPT TARGET SELECTION

(75) Inventors: Boris Ostrovsky, Sudbury, MA (US); Christopher J. Jackson, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 377 days.

(21) Appl. No.: 10/207,611

(22) Filed: Jul. 29, 2002

(65) Prior Publication Data
US 2004/0019723 A1  Jan. 29, 2004

(51) Int. Cl.
*G06F 13/24* (2006.01)

(52) U.S. Cl. ........................ 710/260; 718/105
(58) Field of Classification Search ........ 710/260–269; 718/105
See application file for complete search history.

(56) References Cited

U.S. PATENT DOCUMENTS

| | | | | |
|---|---|---|---|---|
| 5,555,420 A * | 9/1996 | Sarangdhar et al. | ........ | 710/266 |
| 5,555,430 A | 9/1996 | Gephardt et al. | | |
| 5,857,090 A * | 1/1999 | Davis et al. | .................. | 703/25 |
| 5,892,957 A * | 4/1999 | Normoyle et al. | .......... | 710/263 |
| 5,987,538 A * | 11/1999 | Tavallaei et al. | .............. | 710/48 |
| 6,189,065 B1 * | 2/2001 | Arndt et al. | ................. | 710/260 |
| 6,192,442 B1 * | 2/2001 | Haren et al. | ................. | 710/269 |
| 6,237,058 B1 * | 5/2001 | Nakagawa | ................... | 710/260 |
| 6,813,665 B1 * | 11/2004 | Rankin et al. | .............. | 710/260 |
| 2002/0007445 A1 * | 1/2002 | Blumenau et al. | .......... | 711/153 |
| 2002/0040402 A1 * | 4/2002 | Levy-Abegnoli et al. | ... | 709/229 |
| 2002/0161848 A1 * | 10/2002 | Willman et al. | ............. | 709/213 |
| 2002/0166018 A1 * | 11/2002 | Kim | ........................... | 710/260 |
| 2003/0061423 A1 * | 3/2003 | Rankin et al. | .............. | 710/260 |
| 2003/0105798 A1 * | 6/2003 | Kim et al. | ................... | 709/105 |
| 2003/0110336 A1 * | 6/2003 | Park et al. | .................. | 710/260 |
| 2003/0210686 A1 * | 11/2003 | Terrell et al. | ................ | 370/389 |
| 2004/0054866 A1 * | 3/2004 | Blumenau et al. | .......... | 711/202 |

OTHER PUBLICATIONS

Lin, Hwa-Chun, et al., "Performance Study of Dynamic Load Balancing Policies for Distributed Systems with Service Interruptions," Apr. 7-11, 1991, IEEE Tenth Annual Joint Conference of the IEEE Computer and Communications Societies, Vo 2, p. 797-805.*

Lin, et al, "Performance Study of Dynamic Load Balancing Policies for Distributed Systems with Service Interruptions", IEEE, 1991, CH2979-3/91/0000-0797.

* cited by examiner

*Primary Examiner*—Rehana Perveen
*Assistant Examiner*—Brian Misiura
(74) *Attorney, Agent, or Firm*—Meyertons Hood Kivlin Kowert & Goetzel, P.C.; Rory D. Rankin (57) ABSTRACT

A method and device for dynamically targeting interrupts in a computer system. When an operation is initiated, an identifier for the initiator of the operation is stored along with an operation identifier. When an operation completes or needs processor attention due to an error condition or otherwise, the processor or node to interrupt is determined based on the stored indication of the initiator of the operation. An interrupt target data structure may be provided that contains associations between sources that initiate operations and those targets that can service interrupts. If a target scheduled to field an interrupt becomes unavailable, the interrupt can be retargeted to another processor or node by reloading an entry in the interrupt target data structure.

17 Claims, 6 Drawing Sheets

METHOD AND DEVICE FOR DYNAMIC INTERRUPT TARGET SELECTION

TECHNICAL FIELD

The present invention relates to targeting interrupts in a computer system.

BACKGROUND OF THE INVENTION

In today's multi-host, multi-processor computing environment, the number of processors available to initiate input-output ("I/O") operations and to perform further processing, when an operation completes, continues to increase. Further flexibility is provided by I/O devices that may incorporate "channel capability" that allows device behavior to be tailored for each operation. In some implementations, the number of channels supported by a device may number in the millions.

For example, a system may be implemented according to the InfiniBand™ Architecture Specification developed by the InfiniBand Trade Association$^{SM}$, the specification for which is incorporated herein by reference (InfiniBand™ Architecture Specification, version 1.0). The InfiniBand™ Architecture defines a system area network for connecting host processor nodes. The term "node" as used in this specification and in any appended claims means an entity in a computer network or system that includes at least one processor but may include arbitrarily many processors. The InfiniBand™ architecture further defines a switched communications fabric allowing many devices to concurrently communicate with high bandwidth and low latency in a protected, remotely managed environment. System nodes can range from a small server with one processor and a few I/O devices to a massively parallel supercomputer installation with hundreds of processors and thousands of I/O devices.

Figure 1:
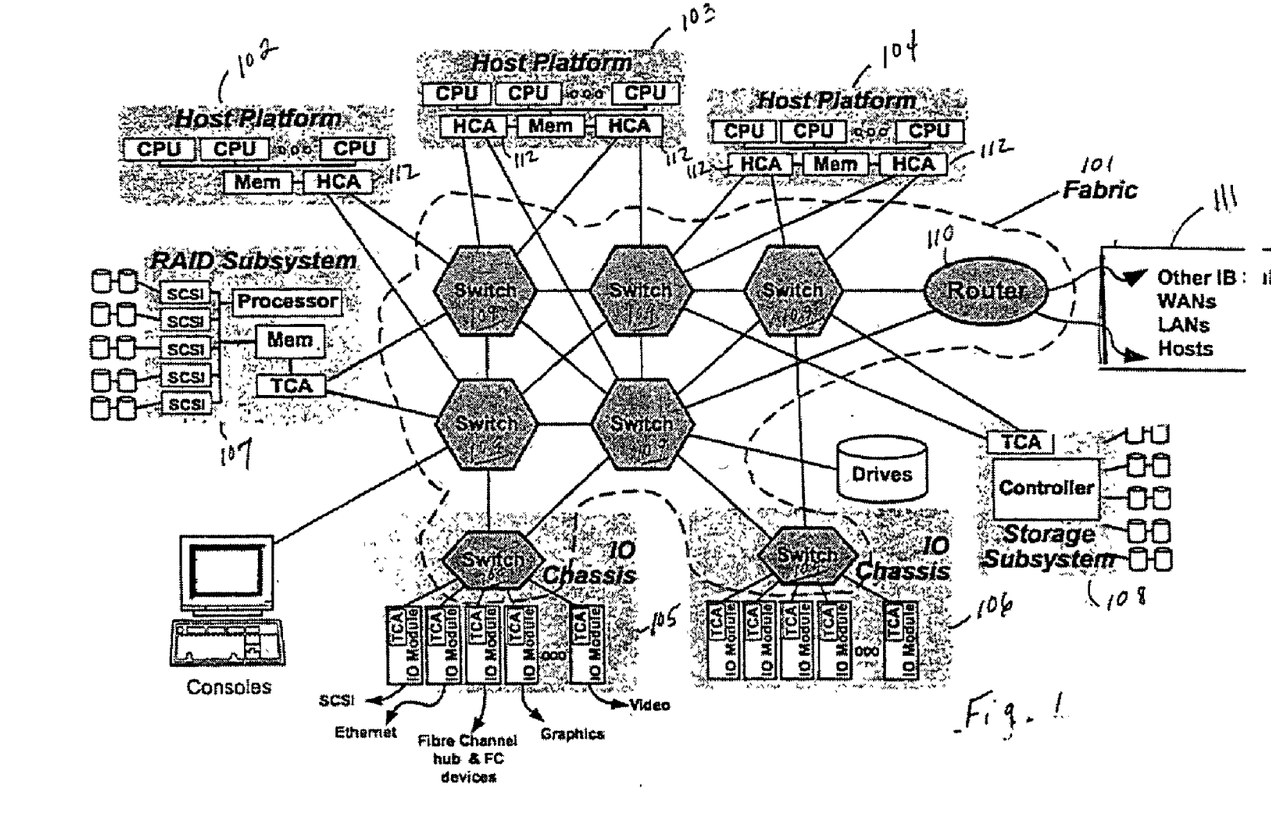
FIG. 1 shows a block diagram of a network of computer nodes according to the InfiniBand™ specification.

Communication among InfiniBand™ nodes is accomplished according to an InfiniBand™ protocol. In addition, the IP (Internet protocol) friendly nature of the architecture allows bridging to an Internet, Intranet, or connection to remote computer systems. As shown in FIG. 1, system 100 consists of processor nodes 102, 103, and 104 and I/O subsystems 105, 106, 107, and 108 connected through the fabric 101. The fabric is made up of cascaded switches 109 and routers 110. I/O subsystems can range in complexity from a single attached device, such as a SCSI or LAN adapter to large memory rich RAID subsystems 107. The number of input/output channels that can be supported by an intelligent I/O subsystem, such as a Host Channel Adapter ("HCA"), may number in the millions according to the InfiniBand™ specification.

An operation is initiated by a process requesting an I/O channel to perform an operation, e.g., for InfiniBand, sending or receiving a message or performing a direct memory access transfer. Upon completion of an operation, an I/O device may interrupt a processor to signal the need for further processing. If a processor that is targeted for such an interrupt cannot service interrupts (e.g., it has been taken off-line or become disabled), a variety of negative consequences can ensue including fatal timeouts that may crash a computer system. Thus, it may be necessary for the operating system to retarget an interrupt from one processor to another processor for an operation that is in process. Further, it may be desirable to retarget interrupts directed to a given processor to another processor for load balancing purposes, or otherwise. Additionally, it may be useful in some systems to target interrupts for an operation to the processor or node that initiated the operation.

SUMMARY OF THE INVENTION

In an embodiment of the present invention, a method is provided to dynamically retarget interrupts for operations in a computer system. An interrupt target table is maintained that associates source processors for operations with the target processor that will service interrupts that occur when operations initiated by a given source processor complete. When an operation is initiated, the identity of the initiating node or processor for the operation is stored with an operation identifier, associating the node or processor with the operation. When the operation completes or otherwise requires attention from a processor, the interrupt target table is queried using the identity of the source processor that is associated with the operation. The interrupt will be directed to the target processor identified from the table. If a target processor cannot service interrupts, interrupts for that processor can be redirected by searching the interrupt target table and replacing target processor identifiers that match the unavailable processor. In this way, interrupts can be quickly retargeted from one processor to another, both for in-process and for future operations.

In another embodiment of the invention, a method is provided for directing interrupts to an initiating processor or node. When an operation is initiated, the identity of the initiating node or processor for the operation is stored with an operation identifier, associating the node or processor with the operation. When the operation completes or otherwise requires attention, the interrupt is directed to the initiating processor or node.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 2A:
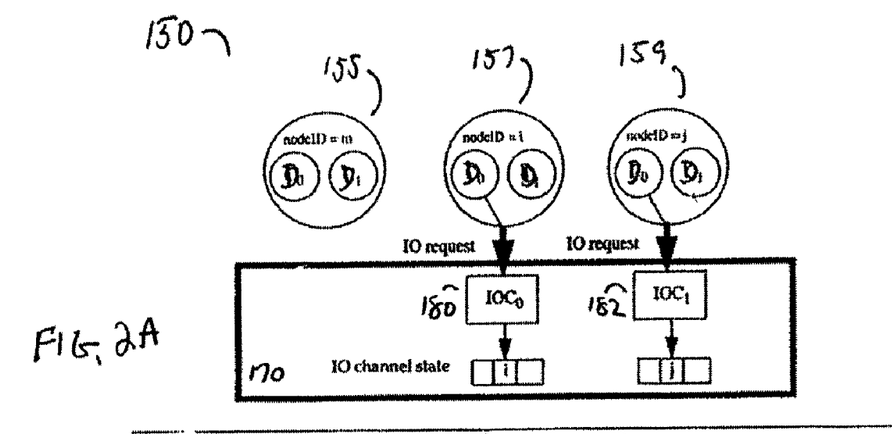
FIG. 2A shows a portion of an InfiniBand™ host including a device that controls an input/output operation according to an embodiment of the invention.
Figure 2B:
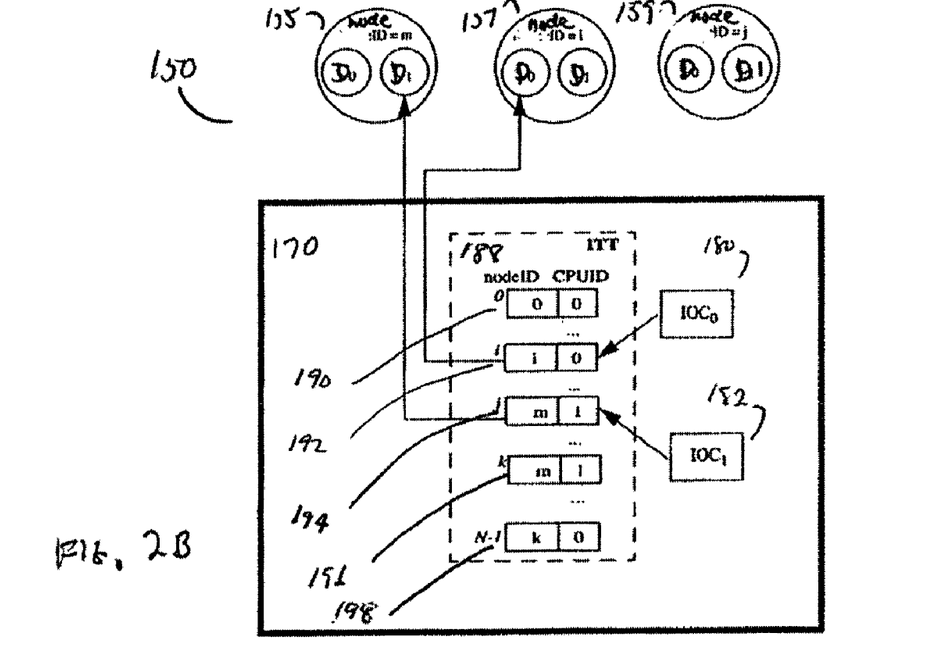
FIG. 2B shows further features of the device of FIG. 2A.

In an embodiment of the present invention, a method for dynamically retargeting processor interrupts for an operation performed by a computer system is provided. While an I/O operation will be used for purposes of illustration, other operations performed by a computer system that generate interrupts that do not involve input/output are within the scope of the invention as described in the claims. FIG. 2A shows a block diagram for a portion of a computer system 150 including a channel adaptor of an InfiniBand™ fabric 100, according to an embodiment of the invention. This portion includes three nodes, 155, 157 and 159, that are labeled "m", "i" and "j". Each node includes two processors, labeled $D_0$ and $D_1$, respectively. A channel adaptor 170 includes a plurality of channels, of which two are shown: $IOC_0$ 180 and $IOC_1$ 182. FIG. 2B shows a further view of channel adaptor 170, which includes an interrupt target table 188. The target table includes a plurality of entries, several of which are shown 190, 192, 194, 196, and 198. Each table entry includes a source identifier value and a target identifier value. The source identifier value in this embodiment identifies a processor node and the target identifier value identifies a node and a processor within that node. Entry 190 includes a source identifier value of node "0" and a target identifier of processor "0" in node "0." Entry 192 identifies node "i" as the source and node "i", processor "0" as the target. Entry 194 identifies node "j" as the source and node "m", processor "1" as the target, and so forth.

Figure 3:
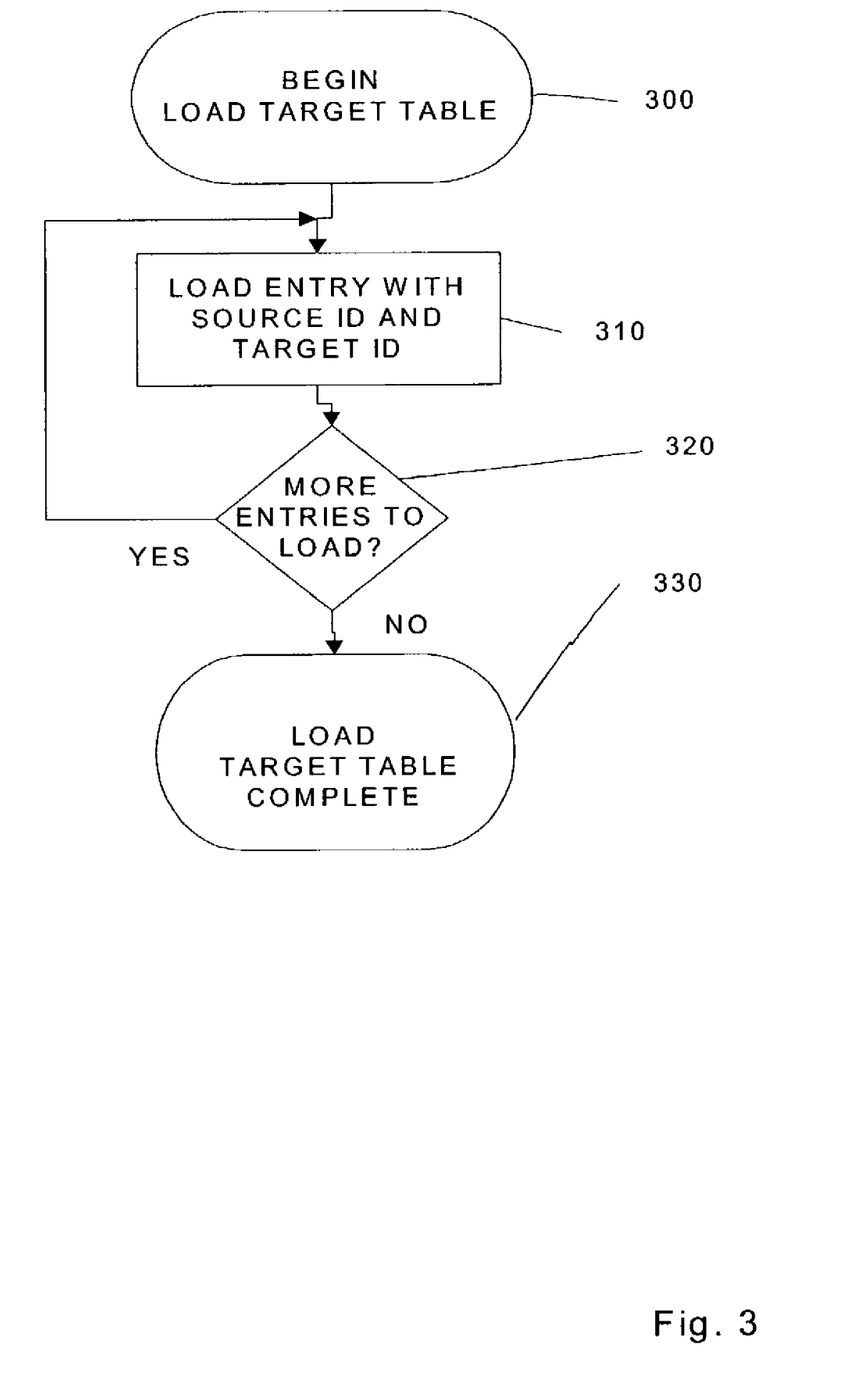
FIG. 3 shows a flow diagram for loading an interrupt target table according to an embodiment of the invention.

Referring to FIG. 3, an interrupt target table 188 is loaded 300, typically by the operating system. The table contains the mapping between sources that initiate operations and the target processor that will be interrupted when the operation completes. Each entry in the table is loaded 310 with a source identifier value and a target identifier value. Subsequent to loading an entry, a test is performed to determine if additional source identifier values are available 320. If additional source identifiers are available, another entry is loaded 310. Otherwise, loading of target table 188 is complete 330.

Figure 4:
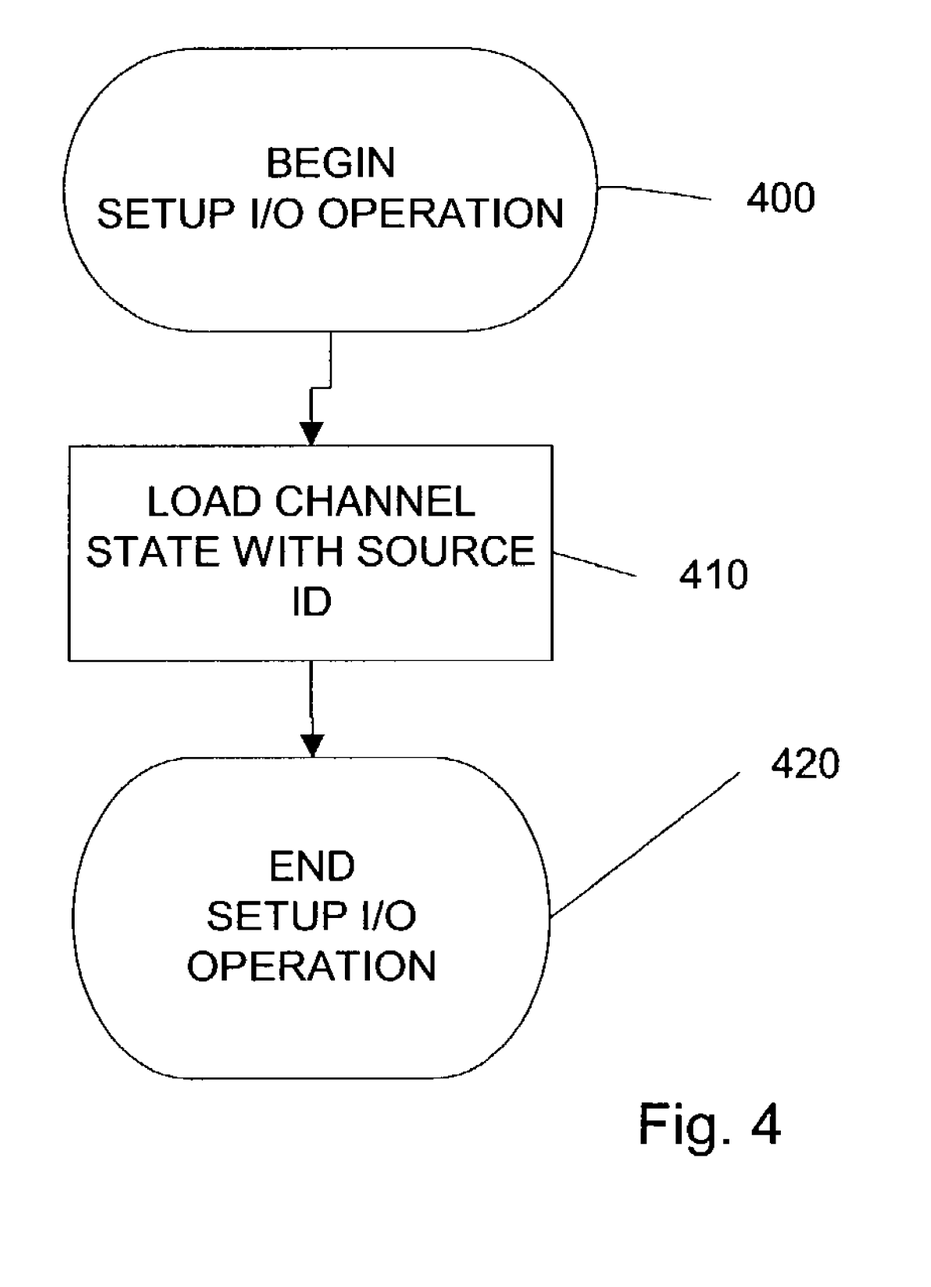
FIG. 4 shows a flow diagram for setting up an I/O operation according to an embodiment of the invention.

When an I/O operation is initiated 400, as shown in FIG. 4, a channel is assigned to the operation and a channel state register (180 or 182) is loaded 410 with a source identifier for the processor that initiated the operation. Subsequently, the setup 110 operation for the assigned channel is complete 420.

Figure 5:
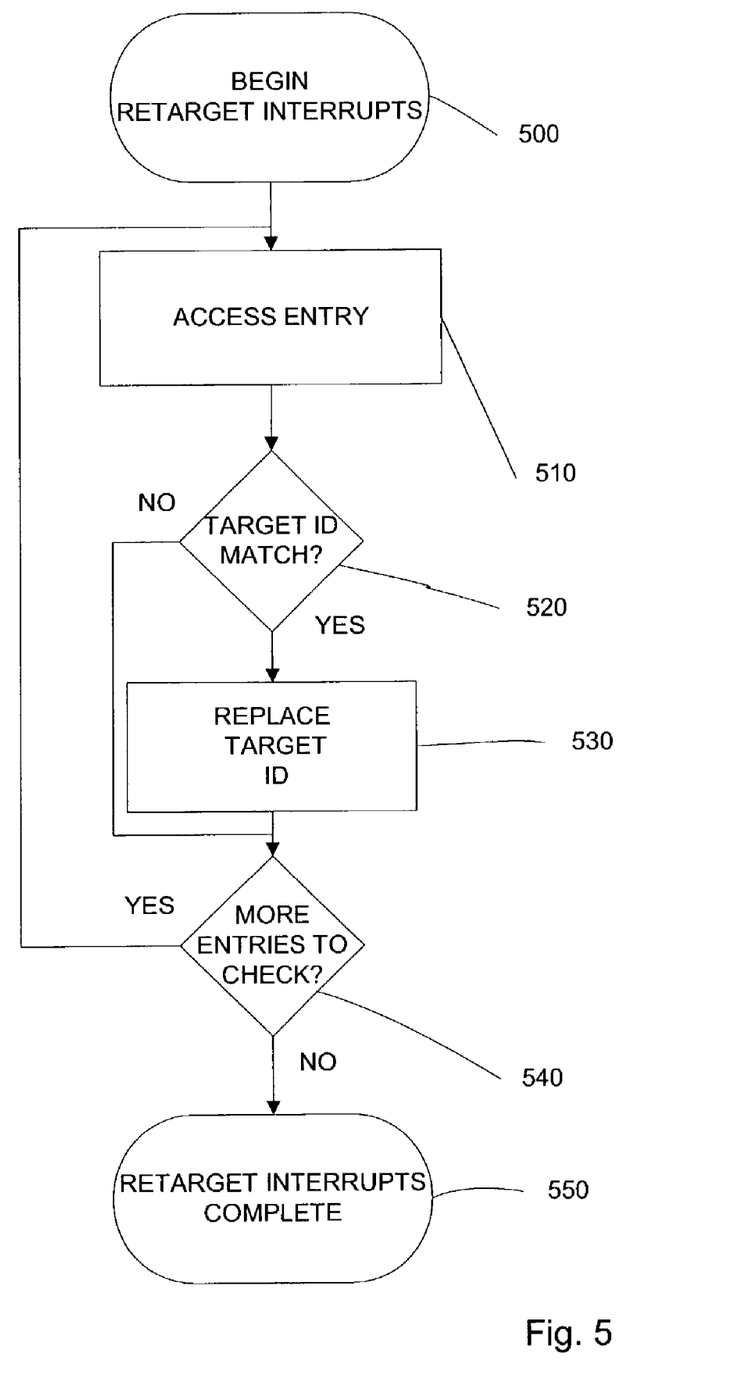
FIG. 5 shows a flow diagram for retargeting an interrupt in an embodiment of the invention.

If a processor is brought off-line or otherwise becomes unavailable to service interrupts, interrupts may be retargeted, typically by the operating system, to other processors as needed 500 (see FIG. 5). Each entry of the target table is scanned 510 to see if the target identifier value matches the identifier of the processor to be brought off-line or that has become unavailable. If a match occurs 520, the target identifier in that entry is replaced 530 by the target identifier of the processor that will service the interrupt when operations corresponding to that target table entry complete. The operations that correspond to that target table entry are all operations initiated by processors identified by the source identifier value contained in that entry. Once all entries of the table are checked 540 and reloaded as needed, retargeting interrupts is complete 550.

Figure 6:
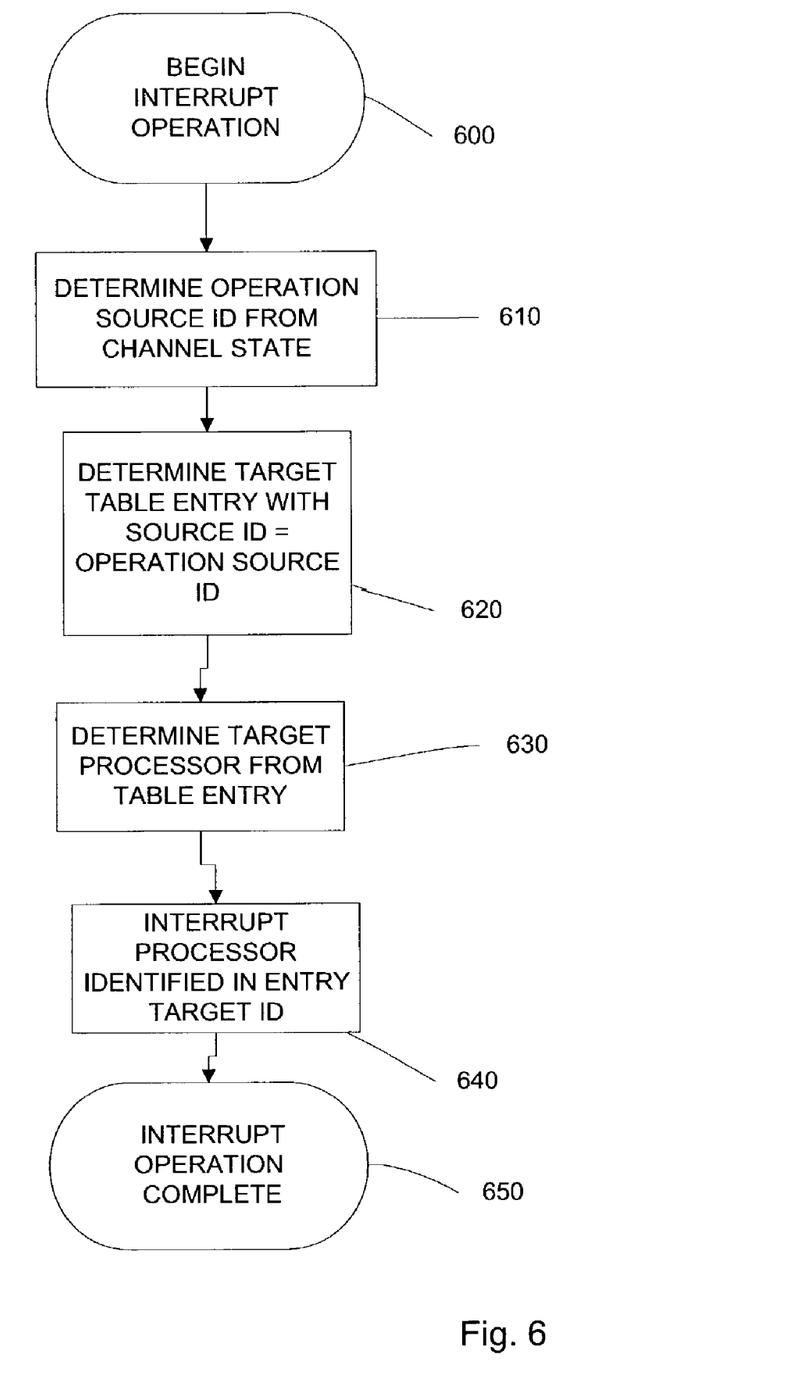
FIG. 6 shows a flow diagram for interrupting a target processor.

When an operation completes or otherwise needs processor attention, such as for an error condition, a processor may be interrupted to perform further processing 600. The source identifier value, corresponding to the processor that initiated the operation, is retrieved from the channel state register 610. The interrupt target table entry corresponding to the source identifier value is determined 620. The target identifier value from this entry is then used 630 to identify the processor that will service the interrupt. If interrupts for the processor have been retargeted since the operation was initiated, the entry in the interrupt target table will contain the value of the retargeted processor, and the interrupt will be directed 640 to that processor. The interrupt operation is then completed 650. Thus, redirection of interrupts from a target processor that has become unavailable to another processor that can service interrupts is facilitated.

In another embodiment of the invention, a method of targeting interrupts to the processor or node that initiated the operation is provided. An interrupt target table as in the preceding embodiment is not required. When an operation is initiated, a source identifier value, corresponding to the processor or node that initiated the operation, is stored in a channel state register, as described previously with regard to FIG. 4. When an operation completes or otherwise needs processor attention, the source identifier value is retrieved from the channel state register and an interrupt is then directed to the node or processor that initiated the operation. This embodiment of the invention advantageously ensures that the source of the operation also processes any interrupts associated with the operation.

A device incorporates an embodiment of the invention that targets interrupts to the processor that initiated the operation. The device includes logic for initiating a given operation including associating the source identifier with the given operation and logic for using the source identifier associated with the given operation to determine the target to interrupt, when the given operation completes The above-described embodiments are shown for purposes of illustration and not by way of limitation. The mapping associating a source processor for an operation and an interrupt target may be described using any one of a variety of data structures, as are known in the art, of which a table is just one example. The term "table" in this specification and in the appended claims is intended to include any one or combination of these data structures. This mapping may be updated for any one of a variety of reasons: for example, one mapping between source processor and target processor may be loaded at system startup time and the mapping may be updated when a node or processor is made operational, for example. Further, while the embodiments described above employ a target identifier that identifies a node and a specific processor within the node, the target identifier could merely identify the node to interrupt. The assignment of the processor within the node to service the interrupt may then be made according to any method known to those skilled in the art.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A method for retargeting interrupts in a computer system, the method comprising:
   providing an interrupt target data structure which includes a plurality of entries, wherein each entry includes a source identifier and a target identifier of a plurality of target identifiers, said target identifier identifying one of a plurality of target resources;
   in response to detecting a first target resource of the plurality of target resources is unavailable:
   examining each entry of the target data structure; and
   replacing each instance of a first target identifier in the target data structure with a target identifier that is different from the first target identifier, in response to determining the first target identifier corresponds to the unavailable first target resource.

2. A method according to claim 1 wherein a first entry of the plurality of entries includes a first source identifier and a second target identifier, the method further comprising:
   associating a first operation with the first source identifier and the first entry;
   accessing the first entry at the completion of the first operation to retrieve the second target identifier;
   interrupting a processor that corresponds to the second target identifier;
   associating a second operation with the first source identifier and the first entry;
   detecting the processor corresponding to the second target identifier is unavailable;
   replacing the second target identifier in the first entry with a third target identifier;
   accessing the first entry at the completion of the second operation to retrieve the third target identifier; and
   interrupting a processor which corresponds to the third target identifier.

3. A method according to claim 1 further including:
   initiating an operation and associating the source identifier with the operation; and
   using the source identifier associated with the operation to access an entry in the interrupt target data structure to determine a target processor to interrupt, when the operation completes.

4. A method according to claim 1, wherein the source identifier for each entry specifies at least a given source node and a given processor within the node.

5. A method according to claim 1, wherein the source identifier for each entry specifies at least a given source node.

6. A device for interrupting a target processor in a computer system at the completion of an operation initiated by a given source processor within a given source node, the device comprising:
   an interrupt target data structure, the data structure including a plurality of entries, each entry including a source identifier and a target identifier of a plurality of target identifiers, said target identifier identifying one of a plurality of target resources;
   logic configured to respond to detecting a first target resource of the plurality of target resources is unavailable by:
   examining each entry of the target data structure; and
   replacing each instance of a first target identifier in the target data structure with a target identifier that is different from the first target identifier, in response to determining the first target identifier corresponds to the unavailable first target resource.

7. A device according to claim 6 wherein a first entry of the plurality of entries includes a first source identifier and a second target identifier, the device further comprising logic configured to:
   associate a first operation with the first source identifier and the first entry;
   access the first entry at the completion of the first operation to retrieve the second target identifier;
   interrupt a processor that corresponds to the second target identifier;
   associate a second operation with the first source identifier and the first entry;
   detect the processor corresponding to the second target identifier is unavailable;
   replace the second target identifier in the first entry with a third target identifier;

access the first entry at the completion of the second operation to retrieve the third target identifier; and interrupt a processor which corresponds to the third target identifier.

8. A device according to claim 6 further including:

logic for initiating an operation and associating the source identifier with the operation; and logic for using the source identifier associated with the operation to access an entry in the interrupt target data structure to determine a processor to interrupt, when the operation completes.

9. A device according to claim 6, wherein the source identifier for each entry specifies at least a given source node and a given processor within the source node.

10. A device for interrupting a target processor in a computer system at the completion of an operation initiated by a given source processor within a given source node, the device comprising:

means for associating each of a plurality of source identifiers with a target identifier of a plurality of target identifiers, each of said target identifiers identifying one of a plurality of target resources;

means for detecting a target resource of the plurality of target resources is unavailable;

means for examining each of the associations of source identifiers and target identifiers and replacing in the means for associating each instance of a first target identifier with a target identifier that is different from the first target identifier, in response to determining the first target identifier corresponds to the unavailable first target resource.

11. A device according to claim 10 wherein a first source identifier is associated with a second target identifier, the device further including:

means for associating a first operation with the first source identifier;

means for retrieving the second target identifier at the completion of the first operation and interrupting a processor that corresponds to the second target identifier;

means for associating a second operation with the first source identifier;

means for detecting the processor corresponding to the second target identifier is unavailable;

means for replacing the second target identifier with a third target identifier;

means for retrieving the third target identifier at the completion of the second operation and interrupting a processor that corresponds to the third target identifier.

12. A device according to claim 10 further including:

means for initiating an operation and associating the source identifier with the operation; and means for using the source identifier associated with the operation to access a target identifier to determine a processor to interrupt, when the operation completes.

13. A device according to claim 10, wherein each source identifier specifies at least a given source node and a given processor within the source node.

14. A method according to claim 1, wherein the target identifier for each entry specifies at least a given target node.

15. A method according to claim 14, wherein the target identifier further specifies a processor within a given target node.

16. A device according to claim 6, wherein the target identifier specifies at least a given target node.

17. A device according to claim 16, wherein the target identifier further specifies a processor within a given target node.

* * * * *